Sept. 13, 1932.  O. L. SKOPIK  1,877,430
DIFFERENTIAL SERVOMOTOR BRAKING DEVICE
Filed March 18, 1930   2 Sheets-Sheet 1
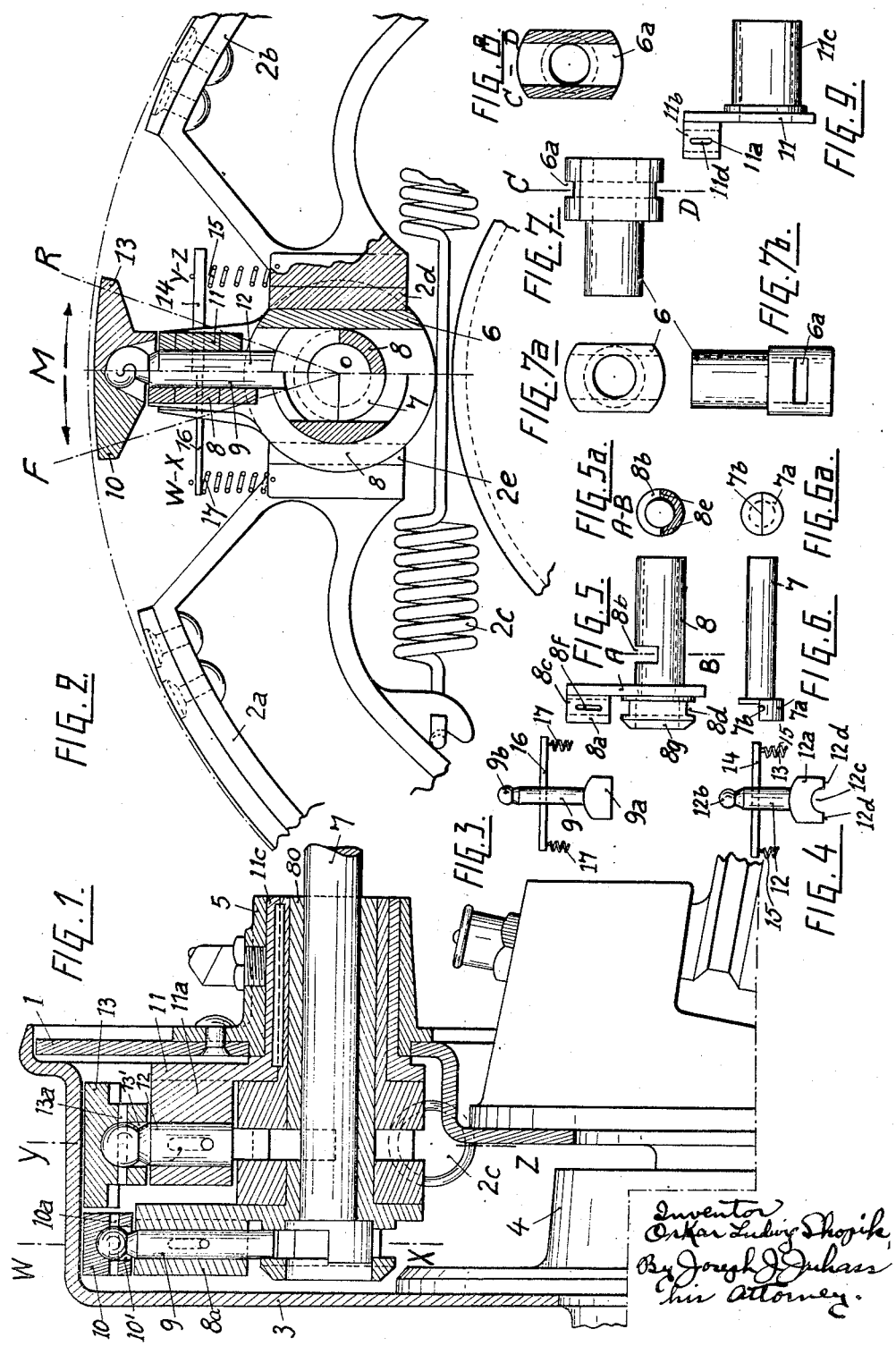

Sept. 13, 1932.  O. L. SKOPIK  1,877,430
DIFFERENTIAL SERVOMOTOR BRAKING DEVICE
Filed March 18, 1930  2 Sheets-Sheet 2
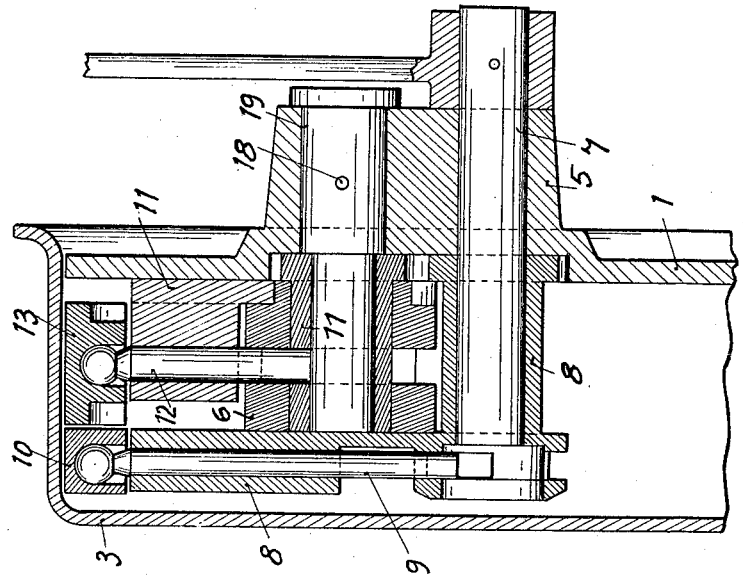
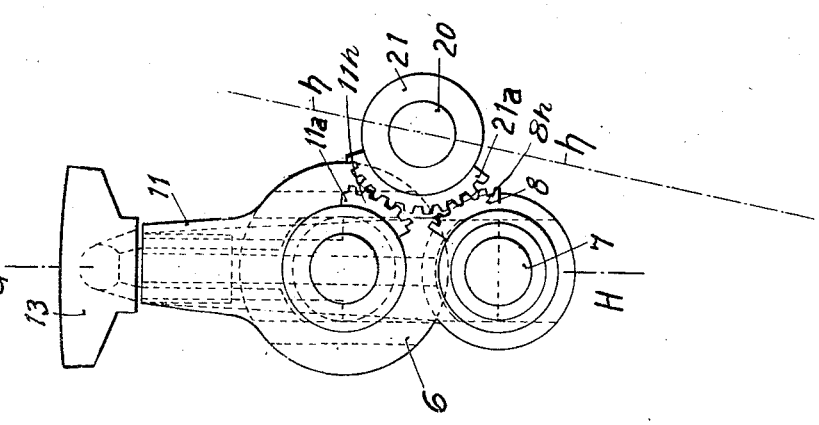
Inventor
Oskar Ludwig Skopik
By Joseph (illegible)
his Attorney Patented Sept. 13, 1932

1,877,430

UNITED STATES PATENT OFFICE

OSKAR LUDWIG SKOPIK, OF BERLIN, GERMANY

DIFFERENTIAL SERVOMOTOR BRAKING DEVICE

Application filed March 18, 1930, Serial No. 436,918, and in Germany November 3, 1927.

The primary object of the present invention is to reduce on an amount as minute as possible the torque moment to be applied from an outer source for tightening or loosening a braking device where for example a heavy freight car is to be braked by the driver's muscular efforts.

Another object of the invention is to construct a braking device symmetrically, such that identical structure may be employed for the right hand and left hand wheels of a vehicle.

The present braking device is characterized in that two auxiliary braking shoes are arranged side by side on the width of the interior surface of the braking drum rim, that is to say within the braking drum rim in the interstice between the braking cheeks, the two bearings or at least one of them being disposed concentrically to the braking cam. In such an arrangement the outer surface of the braking drum rim is, in its full extension, reserved for the disposal of other devices such as cooling ribs and the braking cheeks may, as main braking devices, have the full width of the interior surface of the braking drum rim.

In the accompanying drawings

Figure 1 is a longitudinal sectional view of the improved braking device, taken according to a radial plane going through the cam axis that is to say according to the line M—O of Figure 2;

Figure 2 is, in its lefthand portion, the transversal sectional view taken according o the line W—X of Figure 1, and, in its righthand portion, the transversal sectional view taken according to the line Y—Z of Figure 1;

Figures 3 and 4 are side views of two pushers;

Figure 5 is a side view of a first lever;

Figure 5a is a transversal sectional view of the same taken according to the line A—B of Figure 5;

Figure 6 is a side elevation of the braking shaft;

Figure 6a is an end view of the same;

Figure 7 is a side elevation of the tightening cam;

Figure 7a is an end view of the same;

Figure 7b is a plan view of the same.

Figure 8 is a transversal sectional view according to the line C—D of Figure 7, and Figure 9 is a side elevation of a second lever.

Figure 10 is a diagrammatical end view of a modification, and

Figure 11 is a sectional elevation view of the same taken on the line G—H of Figure 10.

Referring to Figures 1 to 9 the two braking cheeks $2a$ and $2b$ are designed in an exactly symmetrical manner and are arranged within the braking drum 3. The ends of the braking cheeks not shown are hinged upon the cover plate 1 of the braking drum in the well known usual manner. At the shown ends the cheeks are drawn together permanently by means of a strong extension spring, that is to say, they are drawn away from the inner circumference surface of the braking drum. At the opposite braking cheek ends tempered steel track pieces $2d$ and $2e$ are provided. The tightening cam or key 6 is held in its intermediate position between the track pieces by the action of the spring $2c$, whilst, should the cam be rocked in either direction, its edges slide along the steel track pieces $2d$ and $2e$, thereby pushing apart the braking cheeks and pressing the same against the inner surface of the braking drum.

Whilst it is usual that a leverage acts upon the cam directly to rock the braking cam, such a rocking is made according to the invention indirectly.

For this purpose the cover plate 1 is provided with an ear 5 within which a lever 11 provided with a hollow hub $11c$ is rockably mounted. The lever 11 has a projecting extension $11a$, in a radial boring $11b$ of which a pusher 12 is shiftably mounted, as clearly shown in Figures 1, 2 and 4. The pusher is provided at its foot end $12a$ with a half-circular recess $12c$ at either side of which a pushing face $12d$ is formed. At its upper end the pusher has a globular pivot $12b$ extending from below into a pan-shaped recess $13'$ of a braking shoe 13 and being connected with the shoe 13 through a transversal pin $13a$ in such a manner that the shoe is constrained to participate on the reciprocating motion of the pusher 12 but may be adjusted automatically by rocking around the pin 13a serving as pivot.

Furthermore the pusher 12 carries a pin 14 projecting at both ends through elongated slots 11d formed in the lever extension 11a, each of two extension springs 15 being attached with its one end to either end of the pin 14 and with its other end to the braking cheeks 2a and 2b respectively.

The lever 11 is rockably mounted with its hollow hub 11c on and rigidly connected with the braking cam 6, as clearly shown in Figure 1. Therefore the braking cam 6 participates on the movement of the lever 11, when this lever is swung out of its median position MO in its forward or backward positions FO or RO. During this movement the pusher 12 is guided with its foot end 12a in a rectangular vertical slot 6a formed in the braking cam 6.

Within the bored hub of the braking cam 6 another lever 8 is rockably mounted as clearly shown in Figure 1. As with lever 11, lever 8 has an outward projecting extension 8a formed with a radial boring 8c to guide the cylindrical portion of a second pusher 9 which is clearly shown in Figure 3. That end of the hub which projects to the same side as the extension 8a, is thickened and has in the continuation of the boring 8c a rectangular slot 8d forming a guide for the foot end of the pusher 9.

The lever 8 has in its hub a recess 8b occupying nearly the half periphery and registering in width and position with the slot 6a of the braking cam 6. As clearly shown in Figure 5a two shoulders 8e are formed at the ends of the recess 8b.

As in the structure of pusher 12, the pusher 9 ends above in a globular pivot 9b extending in a half-spherical recess 10' formed in a second braking shoe 10. A hinge recess 10a arranged parallelly to the braking cam axis holds the pivot 9b in the recess 10', so that the shoe 10 participates in the outward or inward motion of the pusher 9, but may adjust itself automatically by rocking around the hinge pin 10a. The pusher 9 carries fixed in it a transversal pin projecting at both sides, traversing elongated slots 8f of the lever extension 8a and having attached on its ends extension springs 17 each being connected with one of the braking cheeks 2a and 2b in such a manner, that the pusher 9 together with the shoe 10 is drawn inward continuously.

Within the hollow hub of the lever 8 a tightening and loosing shaft 7, which is clearly shown in the Figures 6 and 6a, is rockably mounted. The said shaft has a thickened head 7a fitting in an enlargement 8g of the boring of the hub of the lever 8. The said head has a horizontally expanded portion 7b occupying half the periphery and corresponding to the shoulders 8e.

The operation of the described arrangement is as follows:

In the intermediate position of the shaft 7 the horizontally expanded portion 7b is horizontally arranged. Should the shaft 7 be rocked in the direction of the rotation of the drum that end or edge of the horizontally expanded portion 7b that lies backward when observed with respect to the rotation of the drum, acts upon the pusher 9 in such a manner that the said pusher is raised against the action of the springs 17. Thereby the braking shoe 10 comes in contact with the rotating drum 3 to be braked. Thereby friction is caused so that the shoe 13 is moved for a little distance in the direction of the rotation of the drum 3; accordingly also the lever 8 is rocked. Thereby the shoulder 8e laying backward with respect to the rotation of the drum 3 raises the pusher 12 against the action of the springs 15, thereby pressing also the shoe 13 against the inner surface of the drum 3. The shoe 13 is moved for a little distance in the direction of the rotation of the drum 3 too; accordingly also the cam 6 is rocked in similar manner as the lever 8 was rocked previously. The cam when being rocked pushes the two braking cheeks 2a and 2b apart thereby initiating the braking operation in the proper meaning of this word.

The torque moment necessary for rocking the shaft 7 is very small. The braking shoe 10 affords a greater torque moment taken from the rotating braking drum itself, the said rotating drum being used as servomotor. The torque moment afforded from the shoe 10 is used to make available a still greater torque moment afforded from the shoe 13, the rotating drum being used as servomotor for a second time. Therefore the two braking shoes 10 and 13 together with the appertaining arrangement act as two relays arranged in steps, both servomotor effects being initiated by the small torque moment that is applied to the shaft 7.

When through a first rocking of the shaft 7 the pusher 9 is raised, the lever 8 is to be rocked for a small distance according to the small movement that the shoe 10 makes in the direction of the rotating drum; consequently the shaft 7 must be rocked a second time in its initial rocking direction for a further small angle for the purpose to hold the shoe 10 pressed against the inner surface of the drum 3, and the shaft 7 is to be rocked a third time for a small angle in the initial rocking direction, when the shoe 13 is moved for a small distance too. By this third rocking of the shaft 7 the lever 11 is held in contact with the pusher 12. The three rockings of shaft 7 are made in rapid succession so that the driver perceives only the aggregational rocking given to the shaft 7.

When at a later time the shaft 7 is returned in its intermediate position, first the springs 17 draw inward the pusher 9 together with the shoe 10. As a result thereof the lever 8 is no longer held in its rocked position. Consequently the pressure acted upon the shoulders 8e through the pusher 12 drawn inward by the springs 15 returns the lever 8 in its intermediate position M C. During this movement the pusher 12 remains in contact with the respective shoulder 8e with the one end or edge 12d of its foot portion 12a. Consequently during the return movement of the lever 8 the springs 15 draw inward the pusher 12 together with the shoe 13, thereby suppressing the braking operation and restoring all the parts ready for the next braking action:

Of course it would be possible to insert for the effects of the springs 17 and 15 the effects of the own weight of the braking shoes and the pushers. But in order to attain a sure operation, the braking shoes would have to be made heavier than usual for such a purpose. In every case the efforts to be made are to be regulated easily by changing the springs.

It is possible to insert for the specified concentric mounting of the tightening cam 6, the two levers 8 and 11 and the shaft 7 the mounting of the two levers being on parallel axles, as clearly shown in Figures 10 and 11. In this arrangement the tightening shaft 7 is rockably mounted in an ear 5 of the cover plate 1 and above the same a bolt 19 is secured in the same ear 5 by means of a transversal pin 18. The bolt 19 carries, rockably mounted on it, the lever 11 and the lever 11 carries, rockably mounted on it, the braking cam 6. The shaft 7 carries, rockably on it, the lever 8. The levers 8 and 11 are provided with a toothed segment 8h and 11h respectively. A transmission gear 21 carrying a toothed segment 21a and connecting the toothed segments 8h and 11h is rockably mounted on a bolt 20 secured in the ear 5 too. The transmission gear is indispensable for the reason that the connected levers 8 and 11 must receive in their simultaneous rocking the same direction.

Provided that the available space is sufficient for the mounting of the second modification this modification is still a little more effective than the first specified modification, in as much as on account of the greater length of the lever 8 a correspondingly enlarged initiating torque moment is attained.

What I claim is:

1. In a differential servomotor braking device in combination with a rotating drum, of two braking cheeks arranged within the drum, a braking cam to press the cheeks against the inner surface of the drum, two auxiliary braking shoes arranged side by side in the interstice between the cheeks to be brought one after the other in contact with the inner surface of the drum, and means to use the first auxiliary braking shoe as servomotor to tighten the second braking shoe and to use the second auxiliary braking shoe as servomotor to rock the cam for tightening the cheeks.

2. In a differential servomotor braking device in combination with a rotating drum, of two braking cheeks arranged within the drum, a braking cam to press the cheeks against the inner surface of the drum, two auxiliary braking shoes arranged side by side in the interstice between the cheeks to be brought one after the other in contact with the inner surface of the drum, the two auxiliary shoes being arranged concentrically to the cam axis, and means to use the first auxiliary braking shoe as servomotor to tighten the second braking shoe and to use the second auxiliary braking shoe as servomotor to rock the cam for tightening the cheeks.

3. In a differential servomotor braking device in combination with a rotating drum, of two braking cheeks arranged within the drum, a braking cam to press the cheeks against the inner surface of the drum, two auxiliary braking shoes arranged side by side in the interstice between the cheeks to be brought one after the other in contact with the inner surface of the drum, one of the auxiliary shoes being arranged concentrically to and the other rockably mounted on a shaft parallel to the cam axis, and means to use the first auxiliary braking shoe as servomotor to tighten the second braking shoe and to use the second auxiliary braking shoe as servomotor to rock the cam for tightening the cheeks.

4. In a differential servomotor braking device the combination according to claim 1 in such an arrangement that all the parts are disposed symmetrically to an intermediate radial plane (M—O) in such a way that all the parts in their normal positions are intermediately arranged and are tightened in being rocked in either direction, for the purpose, to use exactly the same constructional parts at the right hand and the left hand wheels of a vehicle.

5. In a combination according to claim 1 the addition of springs (15 and 17) to be expanded in tightening the auxiliary braking shoes (10 and 13) for the purpose to return the shoes in their normal positions.

6. In a combination according to claim 3 the addition of an intermediate toothed sector (21) meshing with toothed sectors (8h and 11h) connected with the braking shoe levers (8 and 11) for the purpose to give to both shoes the same rocking direction.

In testimony whereof I have signed this specification.

OSKAR LUDWIG SKOPIK.